(12) United States Patent
Pedersen

(10) Patent No.: US 11,207,806 B2
(45) Date of Patent: Dec. 28, 2021

(54) USE OF AN AIR PERMEABLE COMPOSITE SHEET MATERIAL FOR PROPAGATION PLUGS FOR ORGANIC PRODUCTION

(71) Applicant: Ellepot A/S, Esbjerg (DK)

(72) Inventor: Bjarne Brun Pedersen, Aarup (DK)

(73) Assignee: Ellepot A/S, Esbjerg N (DK)

( * ) Notice: Subject to any disclaimer, the term of this patent is extended or adjusted under 35 U.S.C. 154(b) by 252 days.

(21) Appl. No.: 16/307,648

(22) PCT Filed: Jun. 8, 2017

(86) PCT No.: PCT/EP2017/064002
§ 371 (c)(1),
(2) Date: Dec. 6, 2018

(87) PCT Pub. No.: WO2018/007092
PCT Pub. Date: Jan. 11, 2018

(65) Prior Publication Data
US 2019/0299499 A1    Oct. 3, 2019

(30) Foreign Application Priority Data
Jul. 6, 2016 (DK) .......................... PA 2016 00401

(51) Int. Cl.
*B29C 43/10* (2006.01)
*A01G 24/28* (2018.01)
(Continued)

(52) U.S. Cl.
CPC .............. *B29C 43/10* (2013.01); *A01G 24/22* (2018.02); *A01G 24/28* (2018.02); *A01G 24/44* (2018.02);
(Continued)

(58) Field of Classification Search
CPC ....... B29C 43/10; B29C 43/003; B29C 65/02; B29C 66/7294; A01G 24/44; A01G 24/60; A01G 24/28; A01G 24/22; A01G 24/50
See application file for complete search history.

(56) References Cited

U.S. PATENT DOCUMENTS

| 3,788,003 A | 1/1974 | Creighton et al. |
| 4,231,186 A | 11/1980 | Mauno |

(Continued)

FOREIGN PATENT DOCUMENTS

| EP | 1541345 | 6/2005 |
| GB | 2 130 064 | 5/1984 |

(Continued)

OTHER PUBLICATIONS

International Search Report from PCT/EP2017/064002, dated Aug. 23, 2017.
(Continued)

*Primary Examiner* — Cynthia L Schaller
(74) *Attorney, Agent, or Firm* — Morse, Barnes-Brown & Pendleton, P.C.; Sean D. Detweiler, Esq.

(57) ABSTRACT

The present invention relates to the production of propagation plugs, primarily small blocks of sphagnum for the growing of cuttings and seed plants, and of the type consisting of a cylindrical block having an envelope of paper or a similar material and an associated filling of sphagnum or a corresponding substrate material. The paper is an air permeable composite sheet material comprising a) a biodegradable nonwoven sheet material; and b) a hot melt adhesive comprising at least 50% w/w of one or more biodegradable bioplastics. The hot melt adhesive is supplied to at least a part of a face of the biodegradable nonwoven sheet material.

8 Claims, 1 Drawing Sheet

(51) Int. Cl.
  *A01G 24/22*   (2018.01)
  *B29C 43/00*   (2006.01)
  *B29C 65/02*   (2006.01)
  *B29C 65/00*   (2006.01)
  *A01G 24/44*   (2018.01)
  *A01G 24/60*   (2018.01)
  *A01G 24/50*   (2018.01)

(52) U.S. Cl.
  CPC ............ *A01G 24/60* (2018.02); *B29C 43/003* (2013.01); *B29C 65/02* (2013.01); *B29C 66/7294* (2013.01); *A01G 24/50* (2018.02)

(56) References Cited

U.S. PATENT DOCUMENTS

| | | | | |
|---|---|---|---|---|
| 5,382,403 A | * | 1/1995 | Ellegaard | B29C 67/00 264/511 |
| 5,595,020 A | | 1/1997 | Sumio et al. | |
| 2004/0220355 A1 | * | 11/2004 | Whitehouse | C12P 7/62 525/436 |
| 2005/0061204 A1 | | 3/2005 | Skuratowicz | |
| 2006/0009588 A1 | * | 1/2006 | Ton-That | C08K 3/22 525/274 |
| 2006/0162248 A1 | * | 7/2006 | Ahm | A01C 1/02 47/56 |
| 2015/0079291 A1 | * | 3/2015 | Schaller | C09K 17/14 427/331 |

FOREIGN PATENT DOCUMENTS

| | | |
|---|---|---|
| KR | 101301648 | 8/2013 |
| WO | WO 92/03914 | 3/1992 |
| WO | WO 2013/174386 | 11/2013 |

OTHER PUBLICATIONS

International Search Report from PA 201600401, dated Feb. 10, 2017.

* cited by examiner

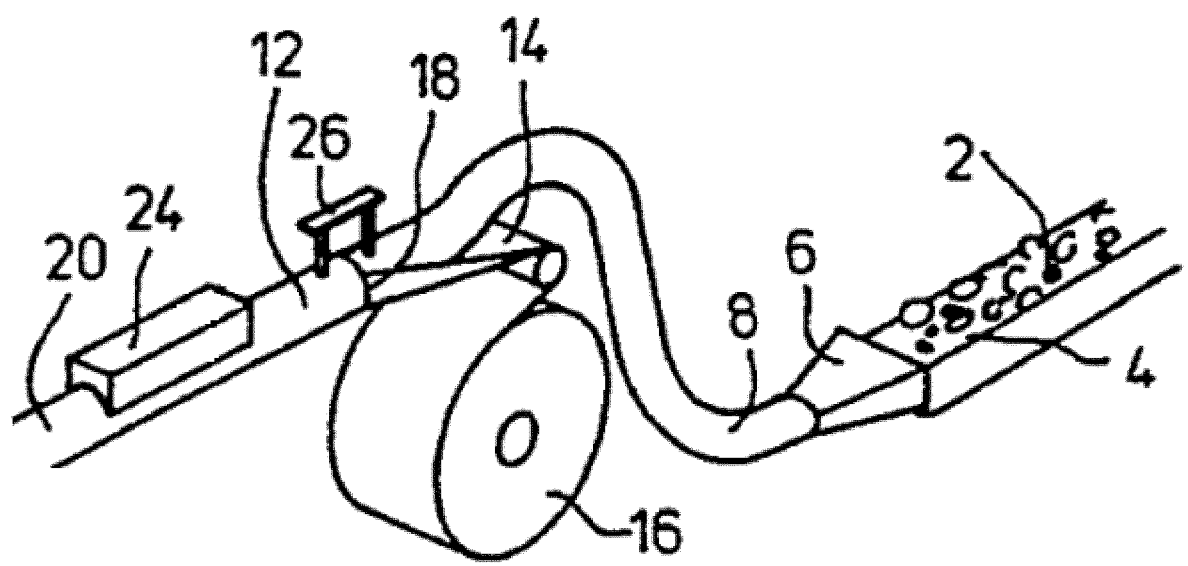

USE OF AN AIR PERMEABLE COMPOSITE SHEET MATERIAL FOR PROPAGATION PLUGS FOR ORGANIC PRODUCTION

RELATED APPLICATIONS

This application is a national stage filing under 35 U.S.C. 371 of International Application No. PCT/EP2017/064002, filed Jun. 8, 2017, which claims priority to Denmark Application No. PA 2016 00401, filed Jul. 6, 2016. The entire teachings of said applications are incorporated by reference herein.

TECHNICAL FIELD OF THE INVENTION

The present invention relates to the production of propagation plugs, primarily small blocks of sphagnum for the growing of cuttings and seed plants, and of the type consisting of a cylindrical block having an envelope of paper or a similar material and an associated filling of sphagnum or a corresponding substrate material.

BACKGROUND OF THE INVENTION

Organic production does not allow for the use of chemically processed or derived fertilizers commonly used in conventional agriculture. Some examples of these fertilizers are Urea, Ammonia, Ammonium Nitrate, Phosphoric Acid, Ammonium Phosphate compounds, and Calcium Nitrate. Materials that are allowed in organic production must be natural, organic materials or raw, mined minerals with few exceptions. When producing propagation plugs having an envelope of paper and an associated filling of sphagnum, it is important that the paper retain its strength when wet, since the paper has a supporting function. This problem has been solved by coating the paper with a binder of petrochemical origin. During the production process of propagation plugs, a continuous paper sheet is folded to a tube. The paper is fixed into a tube shape by gluing together parts of the opposing faces of the paper sheet. Sphagnum is then positioned within the formed tube by suction. The continuously formed tube is then cut into propagation plugs of suitable size. The adhesive that has conventionally been used for the gluing step is a hot melt adhesive based on resins or waxes, mixed with fillers, pigments, and other additives, such as stabilizers. Neither the conventional binder nor the hot melt adhesive can be used in a paper sheet in propagation plugs for organic production.

SUMMARY OF THE INVENTION

It is an object of the present invention to provide a paper sheet suitable for the production of propagation plugs for organic production.

A first aspect relates to the use of an air permeable composite sheet material for producing continuous lengths of propagation plugs, the air permeable composite sheet material comprising:
  a biodegradable and air permeable nonwoven sheet material; and
  a hot melt adhesive comprising at least 50% w/w of one or more biodegradable bioplastics;
  wherein the hot melt adhesive is supplied to at least a part of a face of the biodegradable and air permeable nonwoven sheet material.

As used in the specification and the appended claims, the singular forms "a", "an", and "the" include plural referents unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

The term "continuous lengths of propagation plugs" refers to the production of growth medium, which is made in a continuous line as e.g. disclosed in WO9203914. The length of growth medium is thereafter cut into pieces of suitable size (height relative to the diameter), corresponding to the desired size of a propagation pot.

The term "biodegradable" as used herein describes the chemical dissolution of materials by bacteria or other biological means.

As used herein, the term "nonwoven sheet material" means a sheet material that has a structure of individual fibers or threads which are interlaid, but not in an identifiable repeating manner. Nonwoven sheet materials may be formed by a variety of processes such as, for example, meltblowing processes, spunbonding processes, coforming processes, and hydroentangling.

The fibers used for the air permeable nonwoven sheet material must be biodegradable, which can be natural or synthetic fibers, e.g. cellulosic fibers, protein fibers or synthetic polymer fibers. Natural fibers can comprise pulped or shredded cellulose fibers, such as wood pulp, shredded wood, shredded paper (tissue, newsprint and the like), straw, cotton fiber, composted vegetation, fibrous sphagnum moss, peat moss, shredded stalks including shredded corn stalks and shredded pine straw (including needles, twigs, cones and small branches). Shredded vegetation is preferably dry before shredding. Protein fibers can e.g. be hair or gelatin. Biodegradable synthetic fibers can comprise reconstituted cellulose fibers, such as rayon fibers, vinyl polymer fibers, such as fibrous polyvinyl alcohol and polyamide fibers.

The term "cellulosic fibers" as used herein describes fibers made from an organic compound derived primarily from plants such as trees.

The term "wood pulp fibers" as used herein describes a type of cellulosic fiber made from a lignocellulosic fibrous material prepared by chemically or mechanically separating cellulosic fiber from plants such as trees or cotton.

The term "regenerated/reconstituted cellulosic fibers" as used herein describes a type of cellulosic fiber made from wood pulp using a solvent fiber spinning process. The process involves dissolving wood pulp in a solvent, and spinning the resultant spinning solution into fibers.

In one or more embodiments, the biodegradable and air permeable nonwoven sheet material consist of spunlaced fibers without fiber binding materials. The term "spunlaced" as used herein refers to a structure of individual fibers or threads, which are physically entangled, without thermal bonding. Physical entanglement may be achieved using a water entanglement process, or alternatively, a needling process or a combination of both processes. The spunlaced fibers provide the strength to the nonwoven sheet without the need for a binder, also, and very importantly for the present use, when the nonwoven sheet is wet.

The inventor has found that another way of adding strength to the nonwoven sheet, especially when wet, is to treat the nonwoven sheet material with a binder formulation comprising or consisting of polysaccharide containing at least two carboxylic groups and a low molecular weight organic mono-, di- or poly-carboxylic acid in an aqueous carrier.

The carboxylated polysaccharide is one capable of forming a sol or a gel in the aqueous carrier. The carboxylated polysaccharide of the invention is preferably selected from carboxymethyl cellulose (CMC); polyuronic acid, such as galacturonic acid, for instance as comprised by pectin, including; polyuronic acid such as mannuronic acid and guluronic acid, for instance as comprised by alginic acid; oxidatively degraded polyuronic acid, for instance as disclosed in U.S. Pat. No. 6,903,209; sodium carboxymethyl starch (CMS), for instance as disclosed in U.S. Pat. No. 4,716,186; oxidized starch, for instance as disclosed in U.S. Pat. Nos. 5,959,101 and 6,518,419; carboxmethyl hemicellulose as such and in admixture with carboxymethyl cellulose, such as disclosed in U.S. 2005/0061204 A1; carboxymethyl lignocellulose, such as disclosed in U.S. Pat. No. 7,384,892. The carboxylated polysaccharide of the invention comprises its stoichiometric and non-stoichiometric sodium and potassium salts. Two or more carboxylated polysaccharides can be used in admixture.

The low molecular weight carboxylic acid is preferably an aliphatic carboxylic acid, most preferred a low molecular weight aliphatic di- or three-basic carboxylic acid. In particular, the carboxylic acid is one suitable for human consumption, such as acetic acid, mandelic acid, citric acid, tartaric acid, aspartic acid and glutamic acid. Particularly preferred are citric acid and tartaric acid. "Low molecular weight" in respect of the aliphatic organic acid of the invention signifies a molecular weight of less than 1000 Da, in particular of less than 500 Da, most preferred of less than 300 Da. Two or more carboxylic acids can be used in admixture.

The aqueous carrier is preferably water. The aqueous carrier may additionally comprise small amounts of inorganic salts such as sodium chloride, anti-oxidant such as ascorbic acid, metal ion scavenging agent such as EDTA, neutral or acidic surfactant, and the like.

The binder solution is preferably cured within the temperature range from 60° Celsius to 120° Celsius for 3 to 40 minutes. Still higher curing or drying temperatures require correspondingly shorter heating times, such as, for instance from 1 minute or less at 200° Celsius. Alternatively, curing can be accomplished by heating the wet surface of the fibrous material for a very short time at a very high temperature, such as for a fraction of a second at a temperature of about 900° Celsius by irradiating the fibrous material with an infrared source. An important aspect of the method of the invention is that curing is accomplished by the normal drying temperatures and processing times of the paper machine. The process of the invention does not require non-standard changes in procedures and parameters of the industrial-scale paper machine with which the process is carried out.

Curing temperature and time is influenced by the nature of the carboxylated polysaccharide, the carboxylic acid, their weight proportions in the carrier, and the physical and chemical nature of the fibrous material. A person skilled in the art can determine adequate reaction conditions for a particular combination of carboxylated polysaccharide and carboxylic acid by carrying out a few simple experiments based on the present disclosure of the invention.

The binder formulation may comprise a weight ratio of low molecular carboxylic acid to carboxylated polysaccharide from 0.1 to 30 parts of acid per 100 parts of polysaccharide, more preferred from 5 to 15 parts of acid per 100 parts of polysaccharide. The combined concentration of carboxylated carbohydrate and organic acid in the aqueous carrier can vary from 0.1% by weight to 30% by weight. For spray coating, a dry weight of from 1% to 5% is preferred.

In one or more embodiments, the biodegradable and air permeable nonwoven sheet material is coated with a binder formulation consisting of:
  a polysaccharide containing at least two carboxylic groups, selected from the group consisting of carboxymethyl cellulose; polyuronic acid; oxidatively degraded polyuronic acid; sodium carboxymethyl starch; oxidized starch; carboxmethyl hemicellulose; carboxymethyl lignocellulose; and mixtures thereof; or stoichiometric and non-stoichiometric sodium and potassium salts thereof;
  a low molecular weight organic mono-, di- or poly-carboxylic acid, selected from the group consisting of acetic acid, mandelic acid, citric acid, tartaric acid, aspartic acid, glutamic acid, formic acid, propionic acid, butanoic acid, pentanoic acid, oxalic acid, maleic acid, succinic acid, and glutaric acid; or a mixture of said organic mono-, di- or poly-carboxylic acids; and
  an aqueous carrier.

As used herein, "hot-melt adhesive" refers to a thermoplastic polymer or copolymer (e.g. polyhydroxybutyrate, polyhydroxyvalerate, or polyhydroxyalkanoate) that is heated to obtain a liquid of flowable viscosity, and, after application, cooled to obtain a solid. Generally, the molecular weight of the adhesive is tailored to provide good rheology as a melt and sufficient strength as a solid to resist shearing forces experienced in the application. The primary feature of hot-melt adhesives is the ability of the thermoplastic material (e.g. polyhydroxybutyrate, polyhydroxyvalerate, or polyhydroxyalkanoate) to flow above a certain temperature, and to provide a strong bond at the normal use temperature. Upon cooling, the material hardens, either through passing through the glass transition temperature or the crystallization temperature. This hardening lends physical integrity to the bond.

The hot melt may be coated on the entire face, or on both faces, of the biodegradable and air permeable nonwoven sheet material. Preferably, the hot melt is coated only on the one or two side edge areas (in the longitudinal direction) of the biodegradable and air permeable nonwoven sheet material, since only the joining edge area needs fixation.

In one or more embodiments, the hot melt adhesive comprises or consists of one or more biodegradable bioplastics selected from the group consisting of poly(lactic acid), aliphatic biopolyesters, polyhydroxybutyrate, polyhydroxyvalerate, polyhydroxyalkanoate, cellulose-based bioplastics, and mixtures thereof.

Especially, polyhydroxyalkanoates have shown also to function as soil conditioner. The term soil conditioner implies compounds, which favourably alter the physical and/or chemical properties of soil. The concept of using polymer materials as soil conditioners is not new. Natural polymers such as polyuronic acids, alginic acids, agar, gum, pectin, starch, etc. have been successfully used in the past for soil conditioning. In one or more embodiments, the hot melt adhesive comprises or consists of polyhydroxyalkanoates.

The polyhydroxyalkanoates (PHAs) are synthesized by soil microbes for use as intracellular storage material. Hence, nonwoven sheet material made from the polymers are generally recognized by soil microbes as a food source.

In one or more embodiments, the hot melt adhesive comprises or consists of one or more biodegradable bioplastics selected from the group consisting of a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), a poly(3-hydroxybutyrate-co-3-hydroxyhexanoate), and mixtures thereof.

Preferably, the hot melt adhesive comprises or consists of one or more biodegradable bioplastics of non-GMO (genetically modified organism) origin.

The hot melt adhesive comprises at least 50% w/w of one or more biodegradable bioplastics, such as at least 55% w/w, e.g. at least 60% w/w, such as at least 65% w/w, e.g. at least 70% w/w, such as at least 75% w/w, e.g. at least 80% w/w, such as at least 85% w/w, e.g. at least 90% w/w, such as at least 95% w/w, e.g. at least 99% w/w. Other components may be inorganic fillers or biodegradable organic fillers.

In one or more embodiments, hot melt adhesive comprises a reactive filler component, such as an aluminium compound, a magnesium compound, a calcium compound, a barium compound or a mixture thereof. Preferred are these compounds that react with acidic functional groups, for example carboxylic acid groups, carboxylic acid anhydride groups, hydroxyl groups, acidic amine groups, sulfonic acid groups, phosphonic acid groups, etc. The reactive filler may be, for example, in the form of oxides, hydroxides, silicates, etc., or a mixture thereof. Some exemplary compounds include, for example, aluminum oxide (Al2O3), aluminum hydroxide (Al(OH)3), magnesium oxide (MgO), magnesium hydroxide (Mg(OH)2), calcium oxide (CaO), calcium hydroxide (Ca(OH)2), barium oxide (BaO), barium hydroxide (Ba(OH)2), aluminometasilicates, fluoroaluminosilicates and mixtures thereof. Aluminium compounds are particularly preferred, especially aluminium compounds that react with acidic functional groups.

Aluminium oxide, aluminium hydroxide, aluminium silicate, aluminium metasilicate and mixtures thereof are of particular note.

The reactive filler may be present in the hot-melt adhesive composition in any suitable amount. Of particular note is an amount of about 5% to about 50% by weight, or, of about 10% to about 45% by weight, or, of about 15% to about 40% by weight, based on the weight of the hot-melt adhesive composition. Use of reactive filler in the amounts noted above helps to bring characteristics of the adhesive composition closer to those of the biodegradable and air permeable nonwoven sheet material in terms of thermal expansion, deformation, stiffness, etc.

The amounts noted above also lead to less shrinkage due to consolidation thus reducing internal stress in the adhesive, to less stress concentration in a joint formed with the adhesive, to better fatigue resistance in the joint, and to decreased sensitivity of the adhesive composition to moisture.

A second aspect relates to a method of manufacturing continuous lengths of propagation plugs comprising:
  suctioning sphagnum or a corresponding substrate material through a pipe into a suction chamber for deposition and compaction within the suction chamber by suction applied through a perforated tube in the suction chamber;
  forming a plug of the compacted sphagnum or a corresponding substrate material in an outlet conduit of the suction chamber as part of compacting the sphagnum or a corresponding substrate material within the suction chamber;
  introducing an air permeable composite sheet material through an aperture in the pipe; wherein the air permeable composite sheet material comprises:
    a biodegradable and air permeable nonwoven sheet material; and
    a hot melt adhesive comprising at least 50% w/w of one or more biodegradable bioplastics;
  wherein the hot melt adhesive is supplied to at least a part of a face of the biodegradable and air permeable nonwoven sheet material;
  forming a lining hose from the air permeable composite sheet material in an end portion of the pipe adjacent the suction chamber; and
  joining the edge area of the lining hose by conveying the lining hose containing the compacted sphagnum or a corresponding substrate material through a heating station, such that thereafter the air permeable nonwoven sheet material is stabilized in its hose shape for further advancing inside the pipe.

In one or more embodiments, the method further comprises the step of conveying the lining hose containing the compacted sphagnum or a corresponding substrate material from the suction chamber by gripping the lining hose and moving the gripped lining hose.

A third aspect relates to an air permeable composite sheet material supplied on a reel, the sheet material being of the type used for producing continuous lengths of propagation plugs; the composite sheet material comprising:
  a biodegradable and air permeable nonwoven sheet material; and
  a hot melt adhesive comprising at least 50% w/w of one or more biodegradable bioplastics;
  wherein the hot melt adhesive is supplied to at least a part of a face of the biodegradable and air permeable nonwoven sheet material.

It should be noted that embodiments and features described in the context of one of the aspects of the present invention also apply to the other aspects of the invention.

BRIEF DESCRIPTION OF THE FIGURES

FIG. 1 shows a perspective view of a system performing the method in accordance with various embodiments of the invention.

DETAILED DESCRIPTION OF THE INVENTION

FIG. 1 shows a perspective view of a system performing the method in accordance with various embodiments of the invention. In the right hand side of the FIGURE is shown an amount of sphagnum or a corresponding substrate material 2 supplied on a conveyor belt 4 forwardly conveying towards the end of a suction funnel 6. The suction funnel 6 projects into a first part 8 of a conveyor pipe. It is not decisive how the sphagnum is supplied to the first part 8 of the conveyor pipe, as long as it is a continuous delivery. The first part 8 of the conveyor pipe extends into a folding zone 12, in which an air permeable composite sheet material 14 according to the present invention is supplied from a storage reel 16 and successively wrapped about the first part 8 of the conveyor pipe and continues into a second part 20 of the conveyor pipe. The air permeable composite sheet material 14 continues into the second part 20 of the conveyor pipe through a narrow annular slot 18 (holding means 26 is arranged for fixing of the pipe parts in this area) to form an inner lining hose in the second part 20 of the conveyor pipe.

The air permeable composite sheet material 14 comprises a hot melt adhesive supplied to at least a part of a face of an air permeable biodegradable nonwoven sheet material. The hot melt is activated in a heating station 24, whereby the air permeable composite sheet material 14 is stabilized in its hose shape for further advancing inside the second part 20 of the conveyor pipe.

REFERENCES

2 Sphagnum or a corresponding substrate material
4 Conveyor belt
6 Suction funnel
8 First part of a conveyor pipe
12 Folding zone
14 Air permeable composite sheet material
16 Storage reel
18 Annular slot
20 Second part of a conveyor pipe
24 Heating station
26 Holding means

The invention claimed is:

1. A method of manufacturing continuous lengths of propagation plugs comprising:
   suctioning a substrate material through a pipe into a suction chamber for deposition and compaction within the suction chamber by suction applied through a perforated tube in the suction chamber;
   forming a plug of compacted substrate material in an outlet conduit of the suction chamber as part of compacting the substrate material within the suction chamber;
   introducing an air permeable composite sheet material through an aperture in the pipe; wherein the air permeable composite sheet material comprises:
   a biodegradable and air permeable nonwoven sheet material; and
   a hot melt adhesive comprising at least 50% w/w of one or more biodegradable bioplastics;
   wherein the hot melt adhesive is supplied to at least a part of a face of the biodegradable and air permeable nonwoven sheet material;
   forming a lining hose from the air permeable composite sheet material in an end portion of the pipe adjacent the suction chamber; and
   joining an edge area of the lining hose by conveying the lining hose containing the compacted substrate material through a heating station, such that thereafter the air permeable nonwoven sheet material is stabilized in a hose shape for further advancing inside the pipe;
   Characterized in that:
   the biodegradable and air permeable nonwoven sheet material is coated with a binder formulation consisting of:
   a polysaccharide containing at least two carboxylic groups, selected from the group consisting of carboxymethyl cellulose, polyuronic acid, oxidatively degraded polyuronic acid, sodium carboxymethyl starch, oxidized starch, carboxymethyl hemicellulose, carboxymethyl lignocellulose, and mixtures thereof, or stoichiometric and non-stoichiometric sodium and potassium salts thereof;
   a low molecular weight organic mono-, di- or poly-carboxylic acid, selected from the group consisting of acetic acid, mandelic acid, citric acid, tartaric acid, aspartic acid, glutamic acid, formic acid, propionic acid, butanoic acid, pentanoic acid, oxalic acid, maleic acid, succinic acid, and glutaric acid; or a mixture of said organic mono-, di- or poly-carboxylic acids; and
   an aqueous carrier.

2. A method according to claim 1, wherein the hot melt adhesive comprises one or more biodegradable bioplastics selected from the group consisting of poly(lactic acid), aliphatic biopolyesters, polyhydroxybutyrate, polyhydroxyvalerate, polyhydroxyalkanoate, cellulose-based bioplastics, and mixtures thereof.

3. A method according to claim 1, wherein the hot melt adhesive comprises one or more biodegradable bioplastics selected from the group consisting of a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), a poly(3-hydroxybutyrate-co-3-hydroxyhexanoate), and mixtures thereof.

4. A method according to claim 1, wherein the hot melt adhesive comprises a reactive filler component, selected from the group consisting of: aluminum oxide, aluminum hydroxide, magnesium oxide, magnesium hydroxide, calcium oxide, calcium hydroxide, barium oxide, barium hydroxide, aluminometasilicates, fluoroaluminosilicates, and mixtures thereof.

5. A method according to claim 1, wherein the air permeable composite sheet material is supplied on a reel.

6. The method of claim 1 wherein the substrate material comprises sphagnum.

7. An air permeable composite sheet material supplied on a reel, the sheet material being of the type used for producing continuous lengths of propagation plugs; the air permeable composite sheet material comprising:
   a biodegradable and air permeable nonwoven sheet material; and
   a hot melt adhesive comprising at least 50% w/w of one or more biodegradable bioplastics;
   wherein the hot melt adhesive is supplied to at least a part of a face of the biodegradable nonwoven sheet material; characterized in that:
   the biodegradable and air permeable nonwoven sheet material is coated with a binder formulation consisting of:
   a polysaccharide containing at least two carboxylic groups, selected from the group consisting of carboxymethyl cellulose, polyuronic acid, oxidatively degraded polyuronic acid, sodium carboxymethyl starch, oxidized starch; carboxmethyl hemicellulose, carboxymethyl lignocellulose, and mixtures thereof, or stoichiometric and non-stoichiometric sodium and potassium salts thereof;
   a low molecular weight organic mono-, di- or poly-carboxylic acid, selected from the group consisting of acetic acid, mandelic acid, citric acid, tartaric acid, aspartic acid, glutamic acid, formic acid, propionic acid, butanoic acid, pentanoic acid, oxalic acid, maleic acid, succinic acid, and glutaric acid;
   or a mixture of said organic mono-, di- or poly-carboxylic acids; and
   an aqueous carrier.

8. An air permeable composite sheet material supplied on a reel according to claim 7, wherein the hot melt adhesive comprises a reactive filler component, selected from the group consisting of: aluminum oxide, aluminum hydroxide, magnesium oxide, magnesium hydroxide, calcium oxide, calcium hydroxide, barium oxide, barium hydroxide, aluminometasilicates, fluoroaluminosilicates, and mixtures thereof.

\* \* \* \* \*